United States Patent
Burns et al.

(10) Patent No.: US 12,405,803 B1
(45) Date of Patent: Sep. 2, 2025

(54) SUPERSCALAR EXECUTION USING PIPELINES THAT SUPPORT DIFFERENT PRECISIONS

(71) Applicant: Apple Inc., Cupertino, CA (US)

(72) Inventors: Christopher A. Burns, Austin, TX (US); Liang-Kai Wang, Austin, TX (US)

( * ) Notice: Subject to any disclaimer, the term of this patent is extended or adjusted under 35 U.S.C. 154(b) by 399 days.

(21) Appl. No.: 18/052,000

(22) Filed: Nov. 2, 2022

Related U.S. Application Data

(60) Provisional application No. 63/376,007, filed on Sep. 16, 2022.

(51) Int. Cl.
*G06F 9/38* (2018.01)
*G06F 7/499* (2006.01)
*G06F 7/544* (2006.01)
*G06F 9/30* (2018.01)

(52) U.S. Cl.
CPC ........ *G06F 9/3867* (2013.01); *G06F 7/49947* (2013.01); *G06F 7/5443* (2013.01); *G06F 9/3001* (2013.01); *G06F 9/3836* (2013.01)

(58) Field of Classification Search
None
See application file for complete search history.

(56) References Cited

U.S. PATENT DOCUMENTS

| 8,046,400 | B2 | 10/2011 | Elmer et al. | |
|---|---|---|---|---|
| 9,104,474 | B2 | 8/2015 | Kaul et al. | |
| 9,927,862 | B2 | 3/2018 | Shearer et al. | |
| 10,686,591 | B2 | 6/2020 | Wolrich et al. | |
| 2008/0263325 | A1* | 10/2008 | Kudva | G06F 9/3851 712/203 |
| 2017/0153926 | A1* | 6/2017 | Callegari | G06T 17/10 |
| 2022/0027152 | A1* | 1/2022 | Ware | G06F 9/3001 |

* cited by examiner

*Primary Examiner* — John M Lindlof
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to scheduling instructions for floating-point execution units with different capabilities. In some embodiments, a first pipeline is configured to execute a first type of floating-point operation on operands having up to a first precision and a second pipeline is configured to execute the first type of floating-point operation on operands having up to a second, greater precision. In some embodiments, round circuitry is configured to round results from an output precision of the second pipeline to an output precision of the first pipeline. Scheduling circuitry may select operations for issuance for a given cycle from multiple ready threads. This may include to prioritize a determined highest-precision operation of the first type from ready operations and assign the determined operation to a lowest-precision pipeline, of the multiple pipelines, that is configured to perform the first type of operation according to the operand precision of the determined operation.

20 Claims, 9 Drawing Sheets

Example precision classes

| Precision class | Operation | Execution pipeline | | |
|---|---|---|---|---|
| | Precision class → | 1 | 2 | 3 |
| | | F16 | Mixed | F32 |
| 1 | F16 = F16+F16*F16 | X | X | X |
| 2 | F32 = F16+F16*F16 | | X | X |
| 3 | F32 = F32+F16*F16 | | X | X |
| 4 | F32 = F32+F16*F32 | | | X |
| 5 | F32 = F32+F32*F32 | | | X |

*Select operations from multiple ready threads for issuance to multiple pipelines, for a given cycle, where the multiple pipelines include a first pipeline configured to execute a first type of operation on operands having up to a first precision and a second pipeline configured to execute the first type of operation on operands having up to a second precision that is greater than the first precision*
610

*Prioritize a determined highest-precision operation of the first type from ready operations*
620

*Assign the determined operation to a lowest-precision pipeline, of the multiple pipelines, that is configured to perform the first type of operation according to the operand precision of the determined operation*
630

SUPERSCALAR EXECUTION USING PIPELINES THAT SUPPORT DIFFERENT PRECISIONS

The present application claims priority to U.S. Provisional Application No. 63/376,007, filed Sep. 16, 2022, the disclosure of which is incorporated by reference herein in its entirety.

BACKGROUND

Technical Field

This disclosure relates generally to computer processors and more specifically to pipelines execution units.

Description of the Related Art

A given processor architecture may support operations on operands of different precisions (e.g., 16-bit operations and 32-bit operations). Generally, a given processor may include lower-precision datapath circuitry configured to execute a lower-precision version of an operation and higher-precision datapath circuitry configured to execute a higher-precision version of the operation. Executing lower-precision operations using lower-precision circuitry may reduce power consumption, particularly in certain single-instruction multiple-data (SIMD) contexts like graphics processors.

BRIEF DESCRIPTION OF THE DRAWINGS

FIG. 6 is a flow diagram illustrating an example method, according to some embodiments.

DETAILED DESCRIPTION

Figure 3:
FIG. 3 is a diagram illustrating example precision classes of operations supported by an example processor architecture and example execution pipelines with different capabilities, according to some embodiments.

Disclosed embodiments utilize superscalar techniques to dispatch multiple instructions to different execution units (e.g., floating-point units) with different capabilities. For example, a processor may include the following fused multiply-add (FMA) pipelines: a 32-bit pipeline, a 16-bit pipeline, and a mixed pipeline. FIG. 3, discussed in detail below, provides examples of the operations supported by these different example pipelines, although various other precisions and formats are contemplated.

Rather than simply assigning operations to the pipeline that corresponds to a given operation's precision, disclosed circuitry may sometimes use a higher-precision pipeline to execute a lower-precision operation and round the result to the output precision of the operation. To achieve the same results that would have been achieved by the lower-precision pipeline (and avoid traditional double-rounding issues), the processor may perform two rounding steps, first a round-to-odd and then rounding using a desired rounding mode (e.g., to round-to-nearest-even).

The processor may prioritize execution of higher-precision operations from among a pool of available operations and assign a given operation to the lowest-precision available pipeline configured to perform a given operation. Thus, disclosed techniques may allow higher-precision pipelines to execute lower-precision operations in certain scenarios, while maintaining low dynamic power consumption. This may advantageously improve performance (particularly throughput) relative to traditional techniques, while remaining efficient in terms of power consumption per operation.

Graphics Processing Overview

Figure 1A:
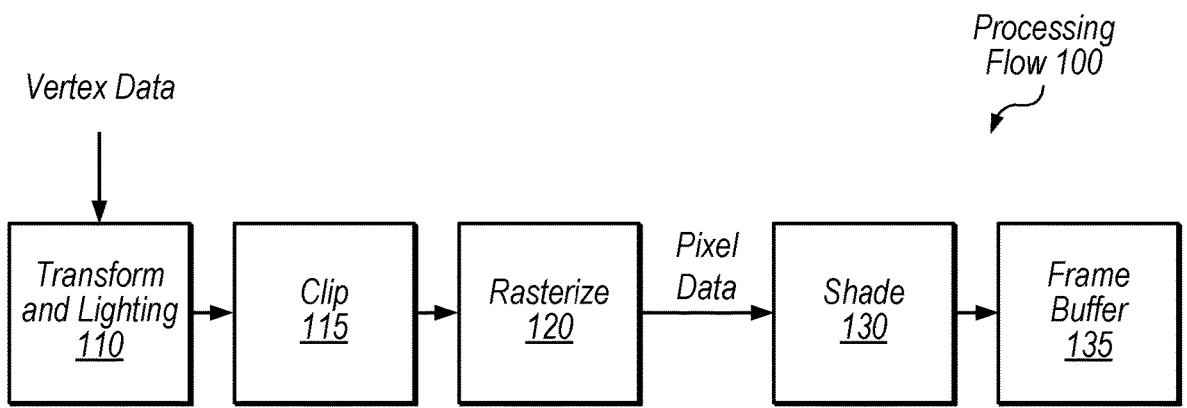
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
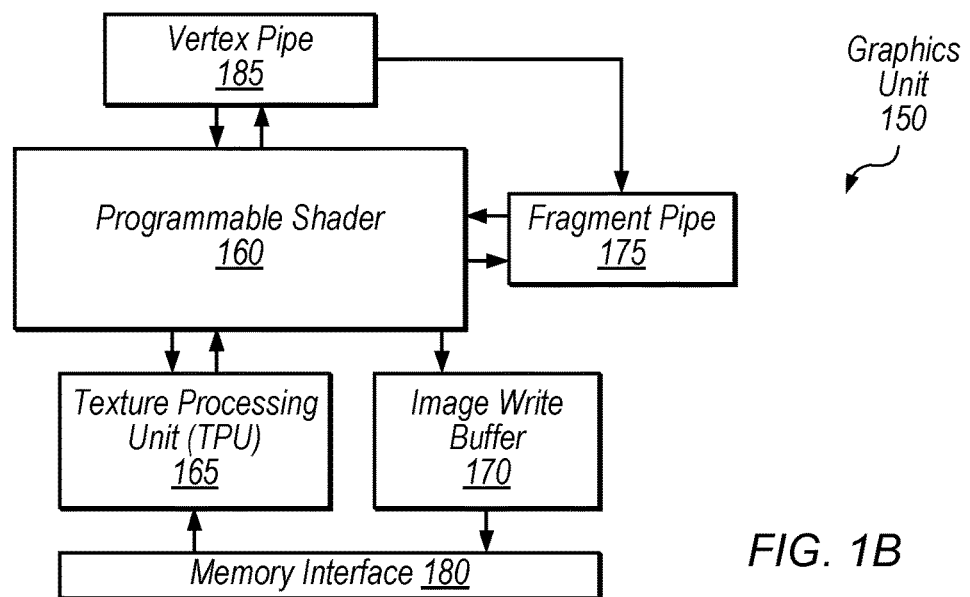
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Note that disclosed techniques may be implemented in various processors including general-purpose processors cores, which may or may not implement SIMD or vector operations.

Overview of Superscalar Scheduling for Multiple Precisions

Figure 2:
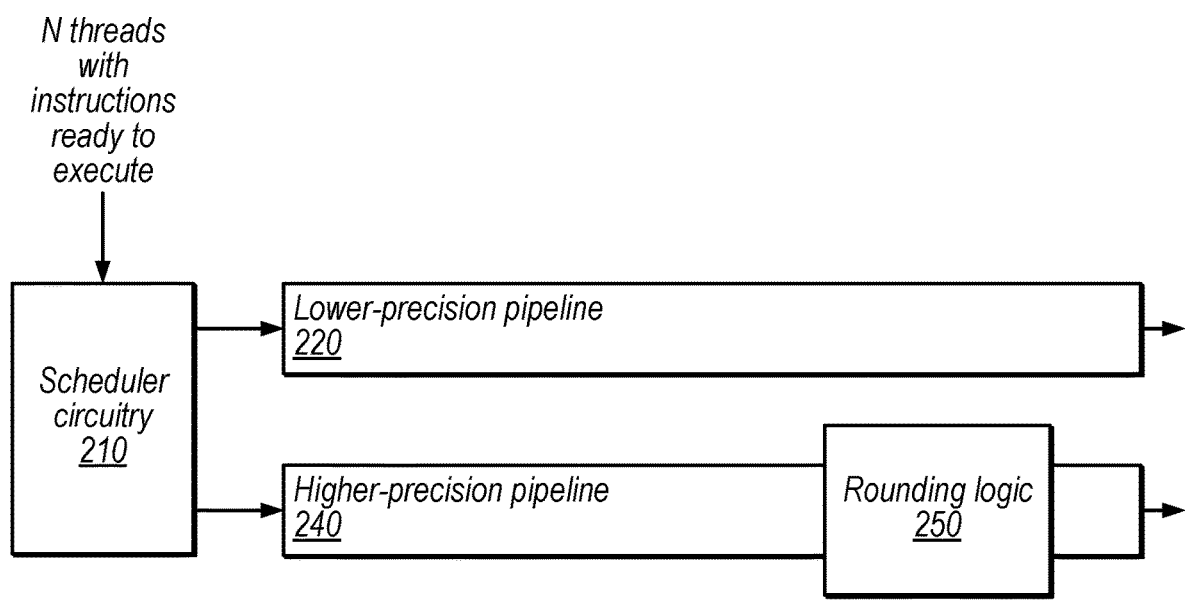
FIG. 2 is a block diagram illustrating a processor with pipelines configured to perform an operation on input operands with different precisions, according to some embodiments.

FIG. 2 is a block diagram illustrating a processor with pipelines configured to perform an operation on input operands with different precisions, according to some embodiments. In the illustrated embodiment, the processor includes scheduler circuitry 210, lower-precision pipeline 220, higher-precision pipeline 240, and rounding logic 250.

Pipelines 220 and 240 may be configured to perform the same operations, e.g., a floating-point fused multiply-add. Pipelines 220 and 240 may use multiple stages to perform an input operation (and may include different numbers of stages).

Scheduler circuitry 210, in the illustrated embodiment, is configured to receive instructions from N threads with instructions ready to execute (that correspond to the operation performed by pipelines 220 and 240). Note that in the SIMD context, scheduler circuitry 210 may receive instructions for multiple SIMD groups ready to execute (where each SIMD group includes a number of threads).

Scheduler circuitry 210 may implement various techniques to select a subset of available instructions for assignment to pipelines 220 and 240 in a given cycle. As discussed in detail below with reference to FIG. 4, scheduler circuitry 210 may schedule the highest-precision ready instruction before lower-precision instructions and may assign a given instruction to the lowest-precision available pipeline capable of executing the instruction. This may increase throughput by executing lower-precision operations on pipeline 240 in some situations, but maintain efficiency by prioritizing assignment of instructions to the lowest-precision (and thus typically lowest-power) appropriate pipeline, when possible.

Rounding logic 250, in the illustrated embodiment, is configured to round down a result from higher-precision pipeline 240 to a precision of lower-precision operations, when higher-precision pipeline 240 is selected to perform a lower-precision operation. For example, if pipeline 240 is configured to handle FMA operations with 32-bit inputs, rounding logic 250 may round down an FMA result from pipeline 240 to 16 bits for a 16-bit FMA operation. In some embodiments, rounding logic 250 is configured to generate a numerically identical result to a result that would have been produced by pipeline 220 for the same operation. This may avoid double-rounding issues when taking an initial properly-rounded FMA result and then rounding to a target output precision.

Note that a "fused" multiply-add refers to an arithmetic operation of the form D=C+A*B, where the product (A*B) incurs no rounding or loss of accuracy before being added to C. Examples of FMA operations are defined by the IEEE-754 standard, for example. Further note that while various floating-point operations are discussed herein, similar techniques may be used for integer units, bitwise operations on non-floating-point operands, etc.

Example Detailed Implementations

FIG. 3 is a diagram illustrating example precision classes of operations supported by an example processor architecture and example execution pipelines with different capabilities, according to some embodiments.

In the illustrated example, there are five precision classes of operations and three precision classes of execution pipelines. In other embodiments, various numbers of operations and pipelines classes may be implemented.

The precision classes of operations, in the illustrated example, have different precisions of input operands, result operands, or both. Different execution pipelines support different subsets of these classes. For example, precision class one utilizes all 16-bit input operands and is the only class supported by F16 execution pipelines. The mixed execution pipeline supports multiplication input operands up to 16 bits, an added operand up to 32-bits, and produces a 32-bit result. Generally, "mixed" precision refers to a pipeline with at least one input operand that is a different precision than another input operand and the output operand. The F32 execution pipeline is the only pipeline that can handle 32-bit multiplication input operands. Control logic may implement the table of FIG. 3 to determine a set of one or more pipelines that support a given FMA operation to be executed.

A given pipeline may include up-conversion circuitry configured to upconvert one or more of its input operands from a lower-precision to a supported precision (e.g., F16 to F32). For example, the up-conversion circuitry may adjust the exponent to reflect a different bias and shift the mantissa appropriately. The up-conversion may be numerically exact, which may allow the higher precision pipeline to generate results identical to a different, lower-precision pipeline.

Note that in some embodiments, other precisions may be supported, including 8-bit, 64-bit, 128-bit, etc. Thus, there may be multiple classes of mixed execution pipelines and more than two classes of non-mixed execution pipelines. Further, disclosed techniques may be utilized with operations for non-floating-point formats, such as integer representations, fixed-point representations, etc. Similarly, while FMA operations are discussed herein for purposes of explanation, similar techniques may be used for various other datapath operations. Thus, a given processor may implement disclosed techniques for multiple different operations, e.g., with a set of multiple pipelines that support different precisions for one operation and another set of multiple pipelines that support different precisions for a different operation.

Figure 4:
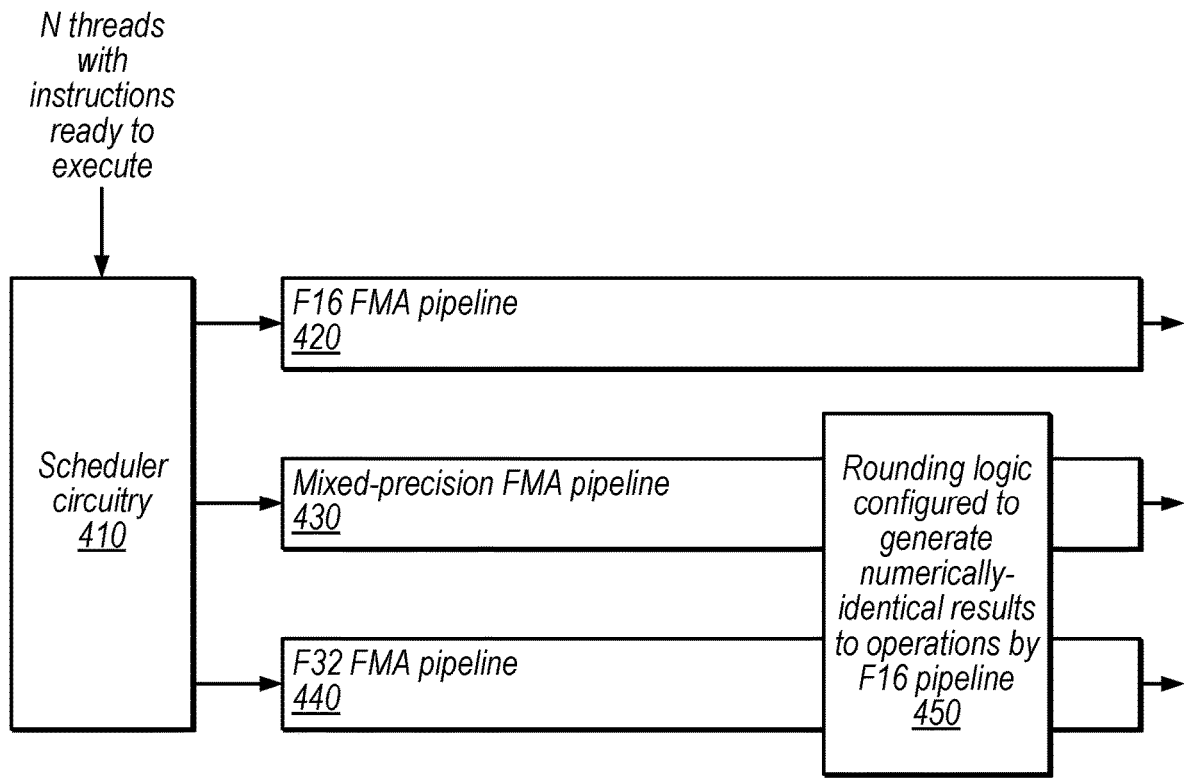
FIG. 4 is a block diagram illustrating example pipeline circuitry corresponding to the example of FIG. 3, according to some embodiments.

FIG. 4 is a block diagram illustrating example pipeline circuitry corresponding to the example of FIG. 3, according to some embodiments. In the illustrated example, the processor includes scheduler circuitry 410, F16 FMA pipeline 420, mixed-precision FMA pipeline 430, F32 FMA pipeline 440, and rounding logic 450.

Pipelines 430 and 440 may include up-conversion circuitry to allow performance of lower-precision operations, as discussed above. Pipelines 420-440 may implement various ALU stages and topologies for the multiplication and add operations. For example, FMA circuitry may utilize multi-path (e.g., near/far or three path) techniques with certain paths utilized to handle certain cases. For addition operations (in the FMA context or non-FMA contexts) various architectures such as Brent-Kung, Kogge-Stone, Sklansky, etc. may be implemented. For multiplication operations (in the FMA context or non-FMA contexts) various architectures such as Booth, combinational, Wallace tree, array, etc. may be implemented. Further, different pipelines in a given processor may implement different numbers of stages, different topologies (e.g., different ALU implementations), or both. Some pipelines may have units with different widths, e.g., mixed-precision FMA pipeline 430 implements 16-bit multiplication and 32-bit addition. Generally, allowing independent ALU implementations for pipelines of different widths may minimize power expenditures while retaining high throughput capability. In particular, the lower-precision pipeline may be designed with a focus on power efficiency while still maintaining a high peak throughput.

Figure 5:
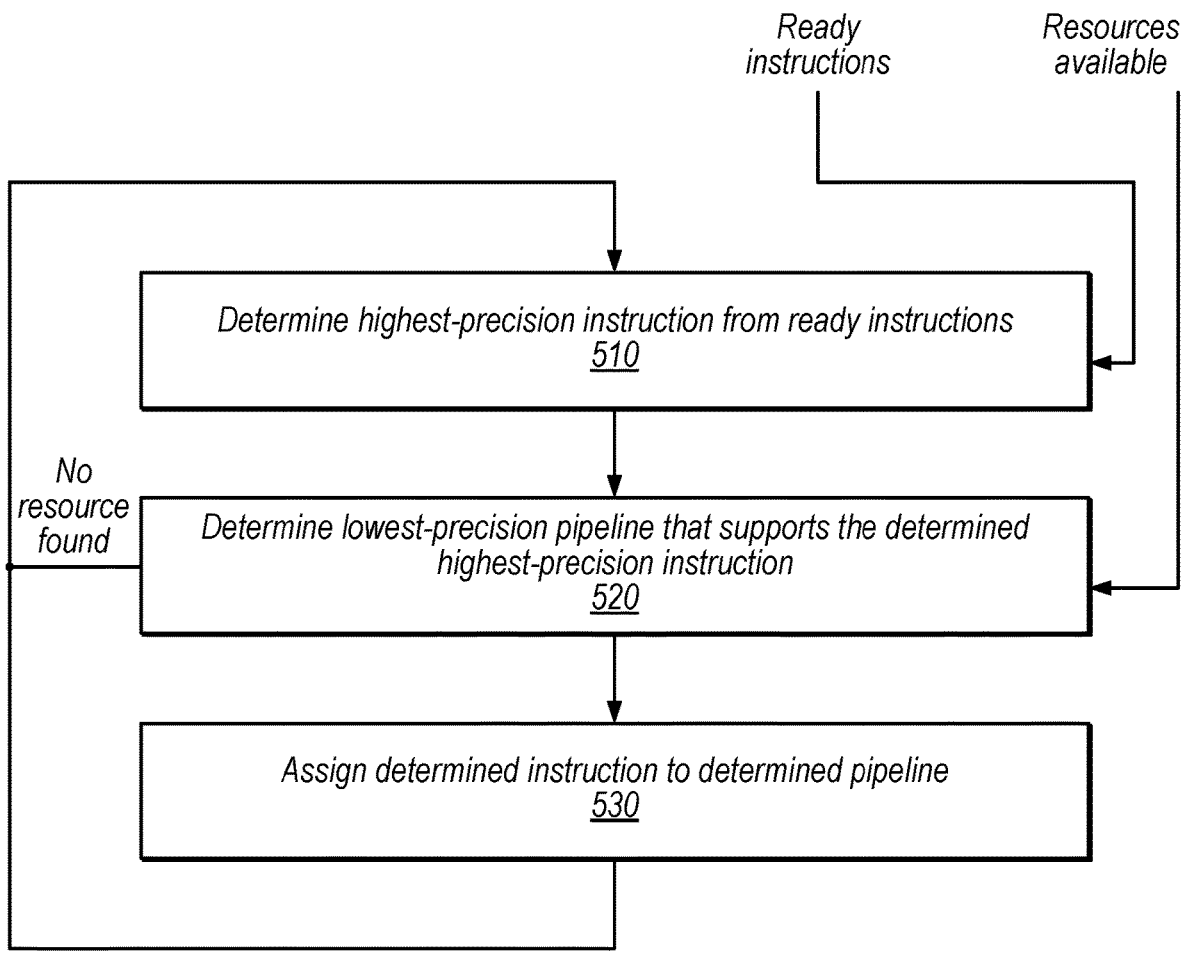
FIG. 5 is a flow diagram illustrating an example scheduling technique for selecting and assigning operations, according to some embodiments.

Scheduler circuitry 410, in the illustrated embodiment, is configured to implement rules that include to schedule a highest-precision ready instruction before lower-precision instructions and to assign a given instruction to the lowest-precision available pipeline capable of executing the instruction. FIG. 5, discussed in detail below, provides a more detailed example selection technique that scheduler circuitry 410 may implement.

In some embodiments, scheduler circuitry 410 is configured to select from a number of ready instructions that potentially exceeds the number of pipelines. This may advantageously improve throughput and power efficiency. In some embodiments, a processor assigns SIMD groups to channels and the channels share resources such as execution pipelines. Scheduler circuitry 410 may therefore select from among multiple channels that have ready instructions of a certain type for assignment to pipelines 420-440.

Although FIG. 4 shows a single execution pipeline for each of three different pipeline precision classes, various numbers of execution pipelines may be implemented for a given precision class. For example, some embodiments may implement multiple F16 pipelines, some pipelines may implement multiple mixed-precision pipelines having the same capabilities, and so on.

Rounding logic 450, in the illustrated embodiment, is configured to generate numerically identical results to operations by the F16 pipeline by rounding outputs of pipelines 430 and 440. This may allow any of the pipelines 420-440 to be selected for F16 FMA operations with deterministic results (without this rounding, the result might be different depending on the pipeline selected for an F16 FMA operation).

In some embodiments, rounding logic 450 is configured to first perform a round-to-odd on the sum result of the FMA operation to odd to generate an initial rounding result then round the initial rounding result (e.g., using one of the four defined IEE rounding modes such as round-to-nearest-ties-to-even (also known as RTNE or round-to-nearest-even). Note that round-to-odd and RTNE are well-understood rounding operations. The initial round-to-odd may round the sum using a greater number of mantissa bits than the actual floating-point format, in some embodiments. Disclosed techniques may avoid double-rounding errors associated with a traditional FMA implementation with a correctly-rounded RTNE FMA round operation followed by a second downward correctly-rounded RTNE operation to another precision. Thus, a higher-precision pipeline may be configured to round differently as part of its ALU operation (e.g., an FMA) when being used to generate a lower-precision result.

FIG. 5 is a flow diagram illustrating an example scheduling technique for selecting and assigning operations, according to some embodiments. At 510, in the illustrated embodiment, scheduler circuitry 410 determines, among a set of ready instructions, a highest-precision instruction. The set of ready instructions may include a window of oldest available instructions. For example, if N SIMD groups have ready instructions that are candidates for scheduling, scheduler circuitry 410 may select from among M oldest instructions, where M is an integer that is less than or equal to N.

At 520, scheduler circuitry 410 determines the lowest-precision pipeline among available execution resources that supports the determined highest-precision instruction. If a resource is not available that supports the instruction, flow proceeds back to 510 and that instruction is not scheduled in the current cycle.

At 530, scheduler circuitry 410 assigns the determined instructions to the determined pipelines. Flow proceeds back to 510 to assign additional instructions. Note that the operations of FIG. 5 may be performed until scheduler circuitry 410 has assigned instructions to all available execution resources.

Scheduler circuitry 410 may perform the technique of FIG. 5 to assign instructions to all available execution resources (or a target number of execution resources) in a single cycle (assuming there are sufficient instructions ready to fill the execution resources). While the technique is shown as an iterative procedure, various elements may be parallelized while still maintaining the indicated assignment of instructions in a given scenario. In other embodiments, other scheduling techniques may be implemented based on the precisions of ready instructions and the precision of available execution resources, e.g., to prioritize throughput of a certain precision class of instruction.

Generally, the disclosed technique of FIG. 5 may advantageously maximize throughput while minimizing dynamic power consumption (particularly when peak throughput is not needed), in some situations and embodiments.

Example Method

FIG. 6 is a flow diagram illustrating an example method for scheduling instructions, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a computing device (e.g., scheduler circuitry 210) selects operations from multiple ready threads for issuance to multiple pipelines, for a given cycle. In the illustrated embodiment, this includes elements 620 and 630. In this example, a first pipeline (e.g., pipeline 420) is configured to execute a first type of operation on operands having up to a first precision and a second pipeline (e.g., pipeline 440) is configured to execute the first type of operation on operands having up to a second precision that is greater than the first precision.

In some embodiments, the first type of operation is a fused multiply-add. In other embodiments, the type of operation may be a multiplication, addition, matrix operation, transcendental, or any of various logical or arithmetic operations performed by execution circuitry. Generally, multiple pipelines may be configured to perform the same type of operation on inputs having different precisions, which may generate approximately equal results if different pipelines operate on the same input operands (while disclosed rounding techniques may provide identical, pipeline-agnostic results).

In some embodiments, the scheduling circuitry is configured to select from instructions for issuance from an instruction window that includes a set of multiple oldest available instructions.

At 620, in the illustrated embodiment, the computing device prioritizes a determined highest-precision operation of the first type from ready operations.

At 630, in the illustrated embodiment, the computing device assigns the determined operation to a lowest-precision pipeline, of the multiple pipelines, that is configured to perform the first type of operation according to the operand precision of the determined operation.

In some embodiments, the computing device (e.g., rounding logic 250) rounds a result from an output precision of the second pipeline to an output precision of the first pipeline. This may occur when an instruction is assigned to a pipeline that is capable of executing higher-precision instructions. Rounding is performed such that a rounded result matches numerically with a result that would have been generated for the operation by the first pipeline. This may include rounding an output of the second pipeline to odd to generate an initial rounding result in the second precision and rounding the initial rounding result to nearest even to generate a result for the first type of operation in the first precision.

In some embodiments, the second pipeline is configured to execute the first type of operation with all input operands having the second precision and the multiple pipelines also include a third pipeline (e.g., mixed-precision pipeline 430) that is configured to execute the first type of operation of which a subset of input operands have the second precision and a subset of input operands have the first precision.

In some embodiments, the first pipeline is configured to provide a 16-bit fused multiply-add result based on three 16-bit input operands, the third pipeline is configured to provide a 32-bit fused multiply-add result based on 16-bit multiplicands and a 32-bit addend, and the second pipeline is configured to provide a 32-bit fused multiply-add result based on at least one 32-bit multiplicand.

In some embodiments, the multiple pipelines include multiple pipelines having the same precision (e.g., two F16 pipelines, two F32 pipelines, three mixed pipelines, etc.).

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Example Device

Figure 7:
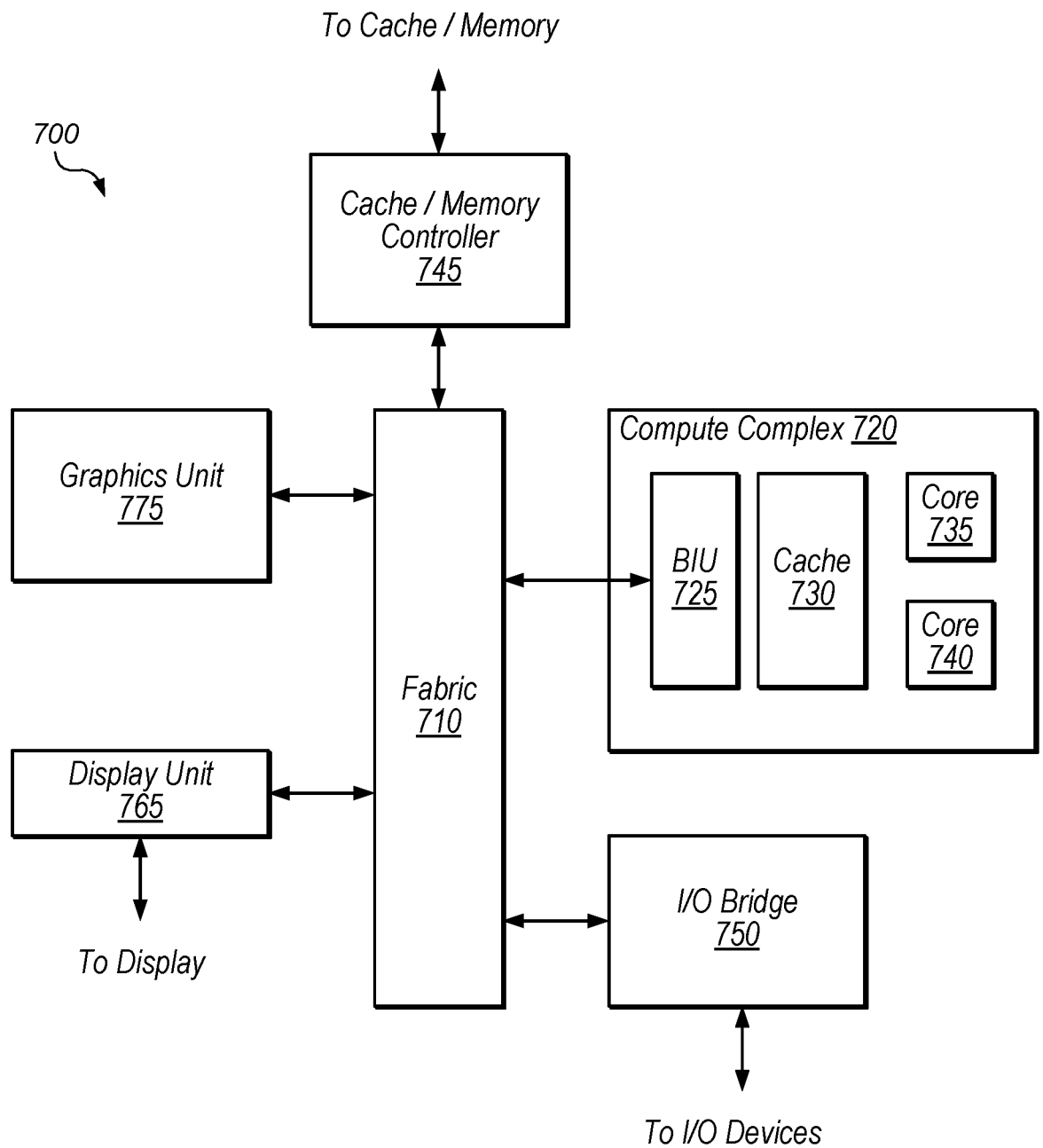
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

In some embodiments, disclosed techniques may advantageously increase throughput of instructions executed by cores 735 and 740.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Graphics unit 775 may include one or more processors, e.g., one or more graphics processing units (GPU's). Graphics unit 775 may receive graphics-oriented instructions, such as OPENGL®, Metal, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques may advantageously increase throughput of instructions executed by graphics unit 775.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 700 with connectivity to various types of other devices and networks.

Example Applications

Figure 8:
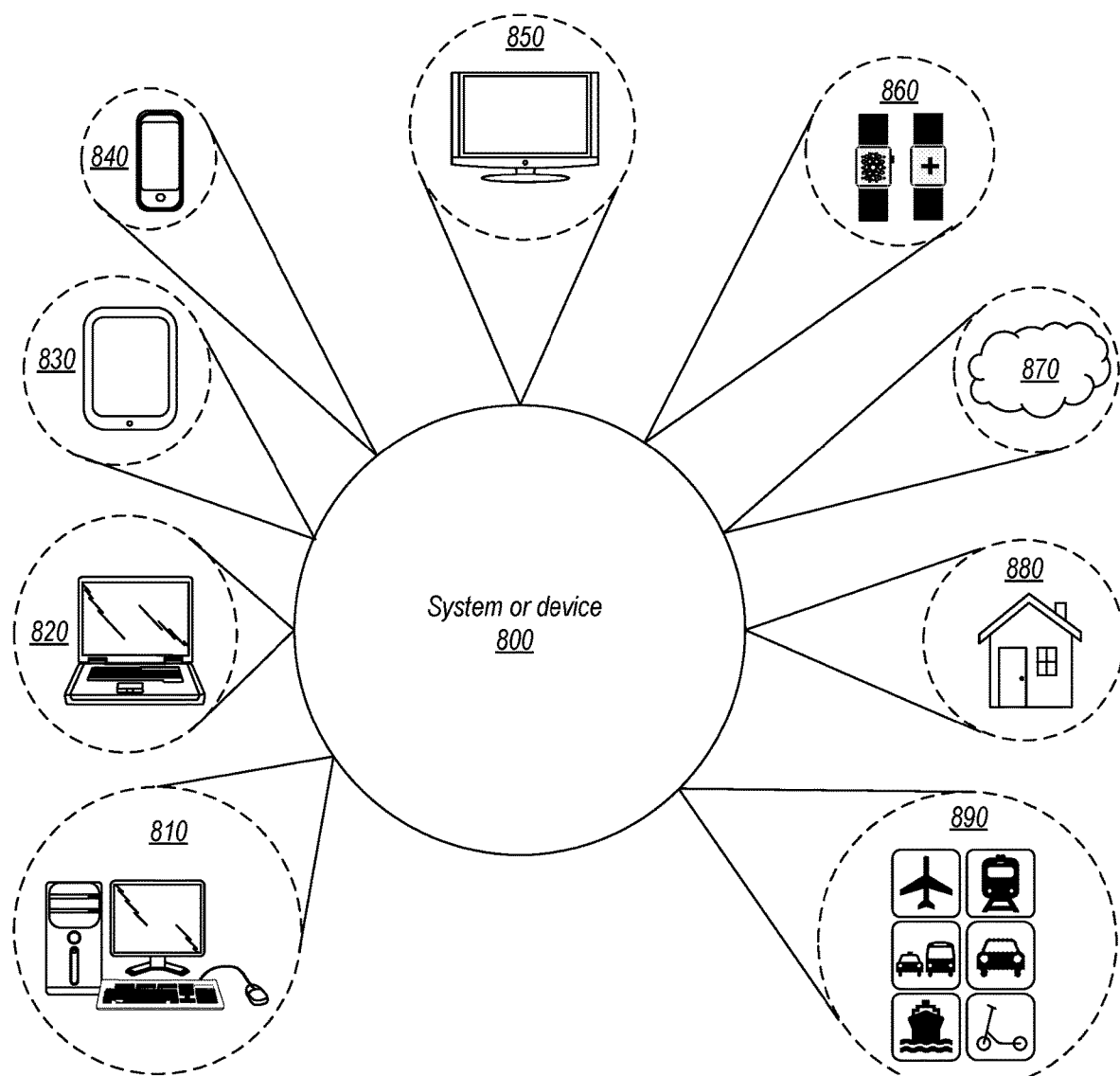
FIG. 8 is a diagram illustrating example applications of disclosed systems and devices, according to some embodiments.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9:
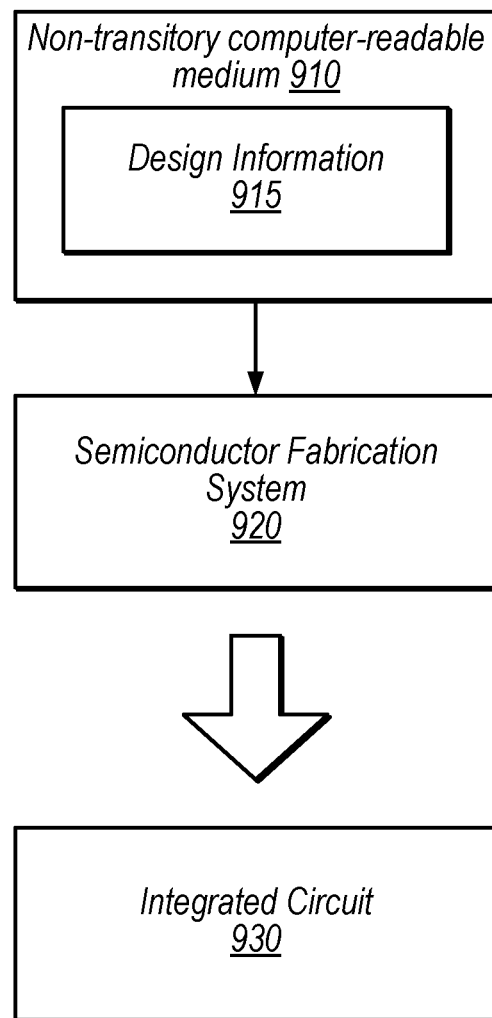
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis, layout, or both of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1B, 2, 4, and 7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . ." does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   pipeline circuitry that includes multiple pipelines, including:
      a first pipeline configured to execute a first type of operation on operands having up to a first precision; and
      a second pipeline configured to execute the first type of operation on operands having up to a second precision that is greater than the first precision;
   scheduling circuitry configured to select operations for issuance to the multiple pipelines, for a given cycle from multiple ready threads, including to:
      prioritize a determined highest-precision operation of the first type from ready operations; and
      assign the determined operation to a lowest-precision pipeline, of the multiple pipelines, that is configured to perform the first type of operation according to the operand precision of the determined operation.

2. The apparatus of claim 1, wherein the first type of operation is a floating-point operation, the apparatus further comprising:

round circuitry configured to round results from an output precision of the second pipeline to an output precision of the first pipeline.

3. The apparatus of claim 2, wherein the round circuitry is configured to:
round to generate a rounded result that matches numerically with a result that would have been generated for the operation by the first pipeline, including to:
round an output of the second pipeline to odd to generate an initial rounding result in the second precision; and
round the initial rounding result to generate a result for the first type of floating-point operation in the first precision.

4. The apparatus of claim 2, wherein the floating-point operation is a fused multiply-add.

5. The apparatus of claim 1, wherein:
the second pipeline is configured to execute the first type of operation with all input operands having the second precision; and
the multiple pipelines further include a third pipeline that is configured to execute the first type of operation of which a subset of input operands have the second precision and a subset of input operands have the first precision.

6. The apparatus of claim 5, wherein:
the first pipeline is configured to provide a 16-bit fused multiply-add result based on three 16-bit input operands;
the third pipeline is configured to provide a 32-bit fused multiply-add result based on 16-bit multiplicands and a 32-bit addend; and
the second pipeline is configured to provide a 32-bit fused multiply-add result based on at least one 32-bit multiplicand.

7. The apparatus of claim 1, wherein the multiple pipelines include multiple pipelines having the same precision.

8. The apparatus of claim 1, wherein the scheduling circuitry is configured to select from instructions for issuance from an instruction window that includes a set of multiple oldest available instructions.

9. The apparatus of claim 1, wherein the apparatus is a computing device that further includes:
a display; and
network interface circuitry.

10. The apparatus of claim 1, wherein the apparatus includes:
a plurality of single-instruction multiple-data pipelines configured to execute instructions; and
fixed-function circuitry configured to control the single-instruction multiple-data pipelines to perform operations for at least one of the following types of programs:
graphics shader programs; and
machine learning programs.

11. A method, comprising:
selecting operations from multiple ready threads for issuance to multiple pipelines, for a given cycle, wherein:
a first pipeline of the multiple pipelines is configured to execute a first type of operation on operands having up to a first precision;
a second pipeline of the multiple pipelines is configured to execute the first type of operation on operands having up to a second precision that is greater than the first precision; and
the selecting includes:
prioritizing a determined highest-precision operation of the first type from ready operations; and
assigning the determined operation to a lowest-precision pipeline, of the multiple pipelines, that is configured to perform the first type of operation according to the operand precision of the determined operation.

12. The method of claim 11, further comprising:
rounding a result from an output precision of the second pipeline to an output precision of the first pipeline, including:
rounding an output of the second pipeline to odd to generate an initial rounding result in the second precision; and
rounding the initial rounding result to generate a result for the first type of floating-point operation in the first precision.

13. The method of claim 11, wherein:
the second pipeline is configured to execute the first type of operation with all input operands having the second precision; and
the multiple pipelines further include a third pipeline that is configured to execute the first type of operation of which a subset of input operands have the second precision and a subset of input operands have the first precision.

14. The method of claim 13, wherein:
the first pipeline is configured to provide a 16-bit fused multiply-add result based on three 16-bit input operands;
the third pipeline is configured to provide a 32-bit fused multiply-add result based on 16-bit multiplicands and a 32-bit addend; and
the second pipeline is configured to provide a 32-bit fused multiply-add result based on at least one 32-bit multiplicand.

15. The method of claim 11, wherein the multiple pipelines include multiple pipelines having the same floating-point precision.

16. The method of claim 11, wherein the selecting selects from instructions for issuance from an instruction window that includes a set of multiple oldest available instructions.

17. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
pipeline circuitry that includes multiple pipelines, including:
a first pipeline configured to execute a first type of operation on operands having up to a first precision; and
a second pipeline configured to execute the first type of operation on operands having up to a second precision that is greater than the first precision;
scheduling circuitry configured to select operations for issuance to the multiple pipelines, for a given cycle from multiple ready threads, including to:
prioritize a determined highest-precision operation of the first type from ready operations; and
assign the determined operation to a lowest-precision pipeline, of the multiple pipelines, that is configured to perform the first type of operation according to the operand precision of the determined operation.

18. The non-transitory computer readable storage medium of claim 17, wherein the first type of operation is a floating-point operation, the circuit further comprising:
- round circuitry configured to round results from an output precision of the second pipeline to an output precision of the first pipeline such that a rounded result matches numerically with a result that would have been generated for the operation by the first pipeline.

19. The non-transitory computer readable storage medium of claim 17, wherein:
- the second pipeline is configured to execute the first type of operation with all input operands having the second precision; and
- the multiple pipelines further include a third pipeline that is configured to execute the first type of floating-point operation of which a subset of input operands have the second precision and a subset of input operands have the first precision;
- the first pipeline is configured to provide a 16-bit fused multiply-add result based on three 16-bit input operands;
- the third pipeline is configured to provide a 32-bit fused multiply-add result based on 16-bit multiplicands and a 32-bit addend; and
- the second pipeline is configured to provide a 32-bit fused multiply-add result based on at least one 32-bit multiplicand.

20. The non-transitory computer readable storage medium of claim 19, wherein the scheduling circuitry is configured to select from instructions for issuance from an instruction window that includes a set of multiple oldest available instructions.

* * * * *